(12) United States Patent
Brookins et al.

(10) Patent No.: US 9,915,299 B1
(45) Date of Patent: Mar. 13, 2018

(54) HYDROSTATIC CLUTCH SYSTEM AND METHOD FOR MAKING POWER UNDER ACCELERATION

(71) Applicants: Ernie Brookins, West Fargo, ND (US); Gail Brookins, West Fargo, ND (US)

(72) Inventors: Ernie Brookins, West Fargo, ND (US); Gail Brookins, West Fargo, ND (US)

(*) Notice: Subject to any disclaimer, the term of this patent is extended or adjusted under 35 U.S.C. 154(b) by 0 days.

(21) Appl. No.: 15/490,974

(22) Filed: Apr. 19, 2017

Related U.S. Application Data

(60) Provisional application No. 62/443,396, filed on Jan. 6, 2017.

(51) Int. Cl.
| | |
|---|---|
| *F16D 31/02* | (2006.01) |
| *F16D 67/02* | (2006.01) |
| *F16H 47/00* | (2006.01) |
| *B60K 6/12* | (2006.01) |

(52) U.S. Cl.
CPC ............... *F16D 31/02* (2013.01); *B60K 6/12* (2013.01); *F16D 67/02* (2013.01); *F16H 47/00* (2013.01); *Y02T 10/6208* (2013.01)

(58) Field of Classification Search
CPC .......... F16D 31/00; F16D 31/02; F16D 31/08; F16D 67/00–67/04; F16H 47/00; F16H 47/02; F16H 47/04; B60K 6/12; B60K 2006/123; Y02T 10/6208

USPC .......................................................... 192/59
See application file for complete search history.

(56) References Cited

U.S. PATENT DOCUMENTS

| | | | | |
|---|---|---|---|---|
| 4,597,483 A | * | 7/1986 | Porel | ...................... F16D 31/02 192/59 |
| 7,824,290 B1 | * | 11/2010 | Brookins | ................. B60K 6/12 475/107 |
| 2011/0003660 A1 | * | 1/2011 | Grant | ....................... B60K 6/12 475/116 |

* cited by examiner

*Primary Examiner* — Richard M Lorence
(74) *Attorney, Agent, or Firm* — Dave Alan Lingbeck

(57) ABSTRACT

A hydrostatic clutch system for dually charging the accumulators while speeding up and slowing down. The hydrostatic clutch system includes a hydraulic pump having a pump housing with openings therein; a manifold/end cover; and a fluid circuit assembly in operable communication with the hydraulic pump. The hydrostatic clutch system may be used with at least one transmission or gear set in operable communication with the hydrostatic clutch. The hydrostatic clutch system may be used to create a variable speed from a fixed input speed. The hydrostatic clutch system may also be used as a hybrid system by changing the pump into a motor for launch and for powering the vehicle with the engine disconnected using accumulated hydraulic pressure. The hydrostatic clutch system captures the resistance of the weight of the vehicle in order to make power while the vehicle is accelerating.

3 Claims, 3 Drawing Sheets

HYDROSTATIC CLUTCH SYSTEM AND METHOD FOR MAKING POWER UNDER ACCELERATION

CROSS-REFERENCE TO RELATED APPLICATIONS

The present application claims priority to the provisional application Ser. No. 62/443,396 filed on Jan. 6, 2017, the disclosure of which is expressly incorporated by reference herein in its entirety.

BACKGROUND OF THE INVENTION

Field of the Invention

The present invention relates to clutches and more particularly pertains to a new hydrostatic clutch system for making power for dually charging the accumulators while speeding up and slowing down; as well as a manifold/end cover modified so as to allow changing the stock pump of the hydrostatic clutch into a motor.

Description of the Prior Art

The use of clutches is known in the prior art. More specifically, clutches heretofore devised and utilized are known to consist basically of familiar, expected and obvious structural configurations, notwithstanding the myriad of designs encompassed by the crowded prior art which have been developed for the fulfillment of countless objectives and requirements.

The prior art includes rotational power distribution and control systems and components thereof along with related methods are disclosed. The rotational power distribution and control system may, for example, be operable to function similarly to a typical automotive manual clutch. Other embodiments of the rotational power distribution and control system may function as continuously or infinitely variable transmissions. Still further embodiments of the rotational power distribution and control system may function as hybrid drive systems for various types of vehicles, including automobiles, trucks, busses, and trains. The rotational power distribution and control system includes at least one hydrostatic pump/motor and a rotational power transmitting apparatus. Another prior art includes a mechanical power transmission system for transforming and delivering power effectively and efficiently using external pressure to propel a vehicle. The mechanical power transmission system includes a case; rotational members; a gear set being in operable communication to at least one of the rotational members; and a clutch system being in operable communication to the gear set and using external fluid pressure from a fluid source to effectively change speeds. Other prior art includes that of a common clutch used in a motor vehicle to connect and disconnect two rotating shafts. Still more prior art includes the torque convertor in an automatic transmission, which also acts as a clutch. Still yet another prior art consists of hydraulic hybrid systems such as the Parker "Runwise" which stores energy from braking into accumulators, releasing the power again for acceleration. While these devices fulfill their respective, particular objectives and requirements, the aforementioned patents and prior art do not disclose a new hydrostatic clutch system.

SUMMARY OF THE INVENTION

The general purpose of the present invention, which will be described subsequently in greater detail, is to provide a new hydrostatic clutch system which has many of the advantages of the clutch and hydraulic hybrid systems mentioned heretofore and many novel features that result in a new hydrostatic clutch system which is not anticipated, rendered obvious, suggested, or even implied by any of the prior art clutches, either alone or in any combination thereof. The present invention may include a stock hydraulic pump having a pump housing with openings therein and a manifold/end cover modified so as to include at least two inlet ports and at least one outlet port; lockup devices to lockup the input; and a fluid circuit assembly in operable communication with the hydraulic pump. The hydrostatic clutch may be used in operable communication with a gear set or transmission to drive a vehicle. The hydrostatic clutch may be used with any transmission, gear box, or gear set.

The operation of the hydrostatic clutch system is made possible due to the modification of the end cover of the pump.

A hydrostatic pump requires the input of mechanical energy to pump hydraulic fluid, while a hydrostatic motor is driven by hydraulic fluid to output mechanical energy. Changing the function of the hydraulic pump in the hydrostatic clutch system to that of a hydraulic motor is accomplished by rerouting fluid through the hydraulic fluid circuit into the modified end cover. With a mechanical energy input, and low fluid pressure at the inlet of the pump, the hydraulic pump pumps hydraulic fluid out, through a high pressure outlet. Directing or driving high pressure fluid into a separate port in the end cover changes the function of the pump into that of a motor, outputting mechanical energy rather than hydraulic energy. This, together with a lockup device on the input shaft, allows the hydrostatic clutch system to function as a clutch. Restricting fluid flow out of the pump/motor, together with backpressure created by the resistance of the weight of the vehicle controls the speed of the vehicle variably.

None of the prior art includes the combination of the elements of the present invention.

There has thus been outlined, rather broadly, the more important features of the hydrostatic clutch system in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new hydrostatic clutch system which has many of the advantages of the clutches mentioned heretofore and many novel features that result in a new hydrostatic clutch system which is not anticipated, rendered obvious, suggested, or even implied by any of the prior art clutches, either alone or in any combination thereof.

The first object of the present invention is to provide a new hydrostatic clutch system that may be used in a motor vehicle for dually making power to drive a vehicle and charging the accumulators while both speeding up and slowing down.

Another object of the present invention is to use the power at the same time that it is being made under acceleration.

Still yet another object of the present invention is to provide a new hydrostatic clutch system that is mechanical variable speed.

Even still another object of the present invention is to provide a new hydrostatic clutch system that uses a fixed speed from the power source and provides a variable output speed.

Another object of the invention is to provide a new hydrostatic clutch that can be used to make the vehicle hybrid by adding a hydraulic motor to be used as a $2^{nd}$ power source.

Another object of the invention is to change the function of the pump into the function of a motor; making a $2^{nd}$ motor available to assist in launching the vehicle.

Another object of the invention is to effect reverse by routing high pressure fluid into the outlet of the functioning motor.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
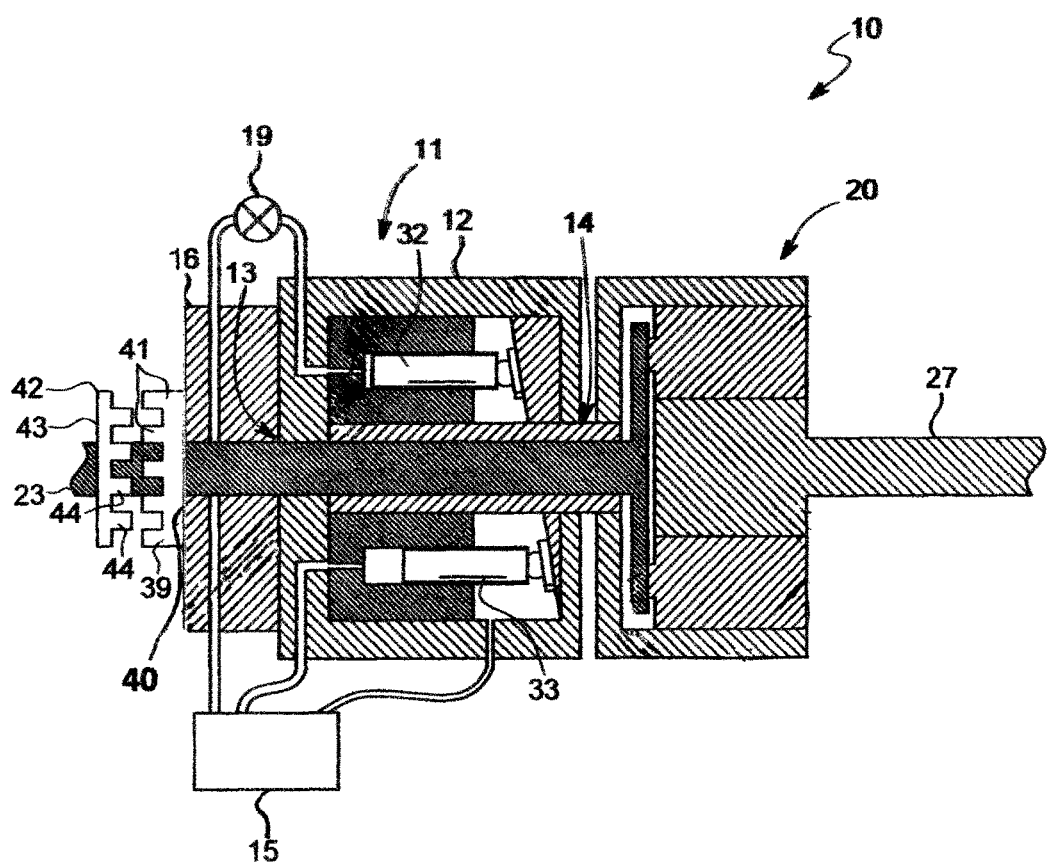
FIG. 1 is a cross-sectional schematic view of one embodiment of a new system for making power under acceleration configured as a hydrostatic clutch.
Figure 2:
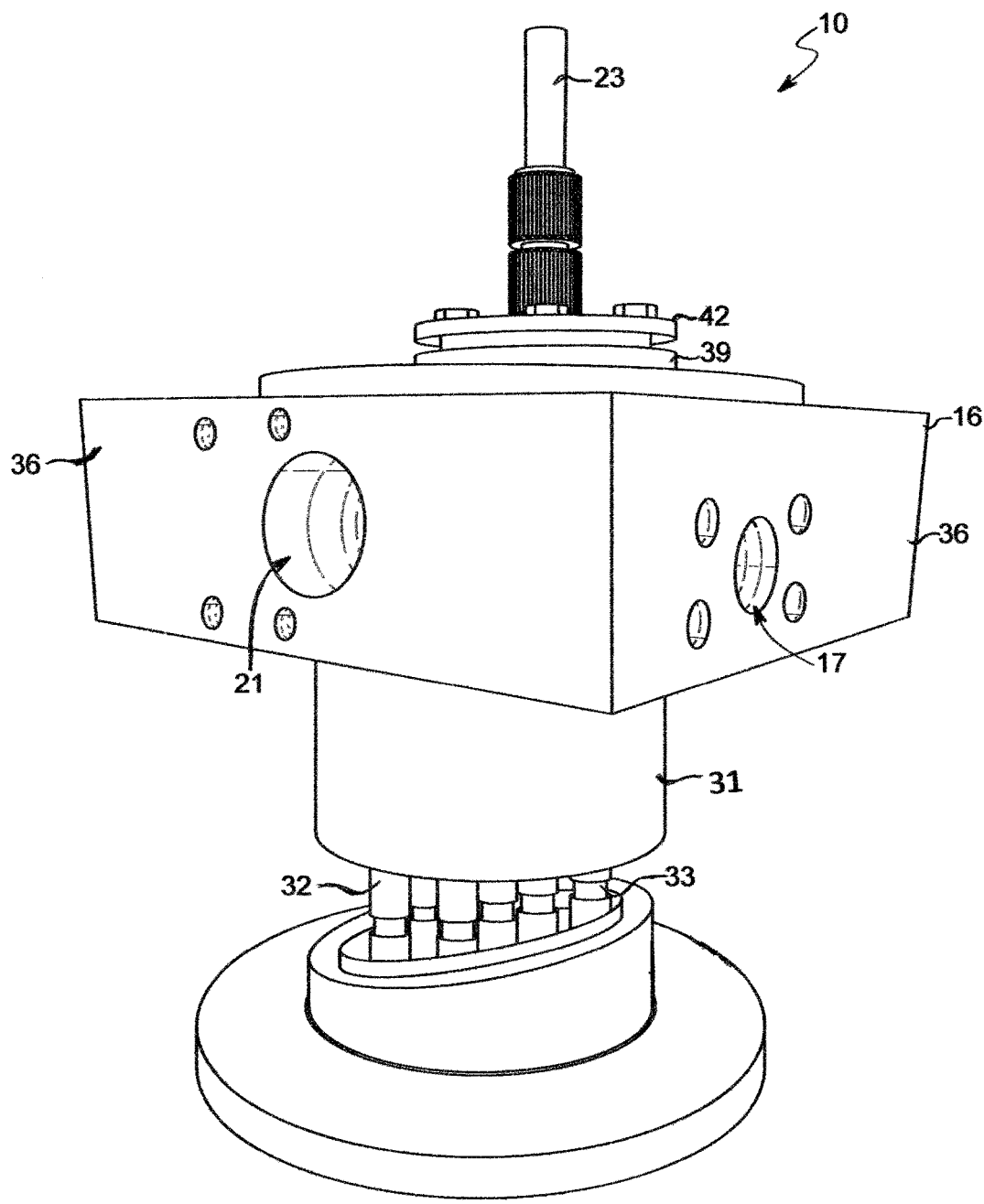
FIG. 2 is a perspective view of the hydrostatic clutch system, including the hydraulic pump, manifold/end cover, input shaft of the present invention together with the engine/power source lockup device.
Figure 3:
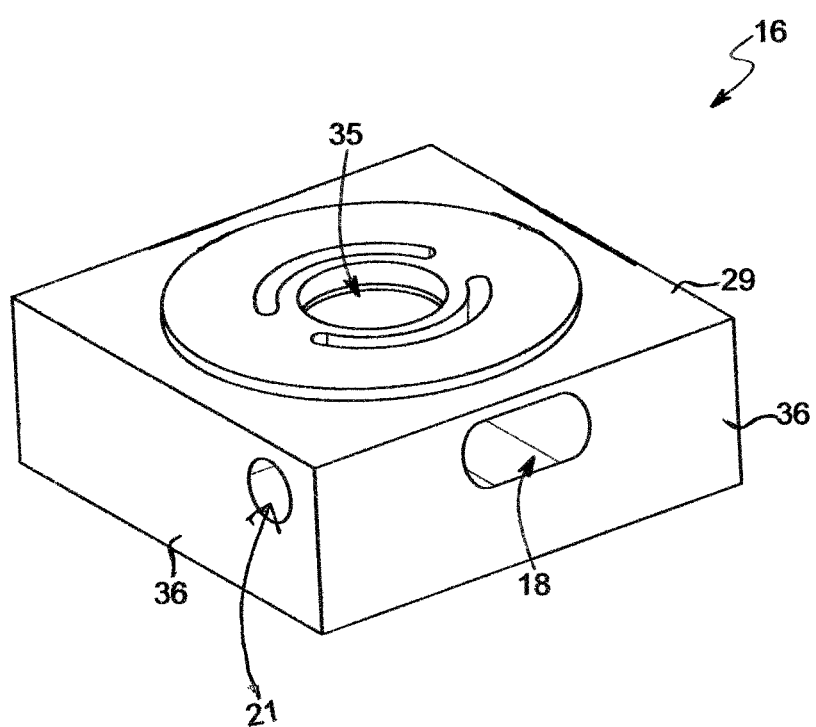
FIG. 3 is perspective view of the manifold/end cover housing, including the various intake and outlet ports of the present invention.

With reference now to the drawings, and in particular to FIGS. 1 through 3 thereof, a new hydrostatic clutch system embodying the principles and concepts of the present invention and generally designated by the reference numeral 10 will be described.

As best illustrated in FIGS. 1 through 3, the hydrostatic clutch system 10 may generally comprise a hydraulic pump 11 having a pump housing 12 with openings 13, 14 therein, and a manifold/end cover 16, and may also comprise a fluid circuit assembly 15 in operable and conventional communication with the hydraulic pump 11. The hydraulic pump 11 is an axial piston pump comprising a plurality of pistons and having a cylinder block. The hydrostatic clutch system 10 may be used with an accumulator (not shown) for storing hydraulic fluid pressure. The manifold/end cover 16 may be conventionally coupled to the hydraulic pump 11 and may include a side wall 36 with ports 17, 18, & 21 disposed therein and include a bore 35 disposed therethrough. The fluid circuit assembly 15 may also include at least one fluid control valve 19 in operable and conventional communication with one of the ports 17 for controlling and releasing hydraulic fluid pressure, and may also include additional manifolds and valves (not shown) to control the inlet ports, 18 and 21. As further illustrated in FIG. 2, the hydrostatic clutch 10 includes an input shaft 23, with one end in communication with the power source and the lockup device. The other end of the input shaft 23 may be in communication with the cylinder block 31 of the hydraulic pump 11. The hydrostatic clutch 10 also includes an output shaft 27.

The hydrostatic clutch 10 may be used in conjunction with any gear set or transmission 20 to power a vehicle. The case 12 of the hydraulic pump 11 may be attached to a case of the any gear set or transmission 20 using any method of fastening, while the output shaft 27 may be conventionally coupled with the shafts and/or gears of the any gear set or transmission 20 so as to allow interaction between the hydrostatic clutch 10 and the any gear set or transmission 20.

The input shaft 23 may also include input shaft lockup members 39, 42 conventionally disposed about the end of the shaft 23 with at least one of the input shaft lockup members 39 conventionally coupled to the pump end cover 16 to lockup the shaft 23 with the hydraulic fluid pressure being used to propel the vehicle. The input shaft lockup members 39, 42 may be lockup plates 39, 42 with holes disposed therethrough and with each lockup plate 39, 42 having flanges 41, 44 conventionally attached to and spaced along a perimeter 40, 43 of the respective lockup plate 39, 42. One or more of the lockup plates 39, 42 may be movably disposed face to face with the flanges 41 of one of the lockup plates 39 conventionally engagable with the flanges 44 of an adjacent lockup plate 42 to lockup and prevent the rotation of the shaft 23 so that the stored hydraulic fluid pressure is used to propel the vehicle. In place of the lockup device, any mechanism may be used to disconnect the power source from the hydrostatic clutch system, such as a clutch. In an alternative embodiment, the power source may be turned off.

In use, while the vehicle is under acceleration, the said any gear set or transmission 20 may be actuated by the output shaft 27 of the hydrostatic clutch 10. Backpressure in the pump 11 is created by using the weight of the vehicle as resistance to apply a load to the hydrostatic pump 11, effectively braking the pump 11. Fluid flow from the hydrostatic clutch 10 is restricted at the outlet port 17 by the valve 19, and the hydraulic backpressure/power created in the pump 11 is sent to an accumulator (not shown), and is then further sent to an assist motor (not shown) which can be located anywhere in the drivetrain. The assist motor thus assists the power source in powering the vehicle by using the fluid pressure from the accumulators, and/or the hydrostatic pump system. The hydraulic fluid pressure may be variably regulated and released by the at least one control valve 19 and by the rotation resistance of the hydrostatic clutch system 10 as a result of the weight of the vehicle. The speed of the hydraulic pump 11 and the vehicle with a fixed input from the engine of the vehicle may be controlled using the hydraulic fluid pressure from the accumulator to effect variable speed while the fluid pressure is being created. The pump 11 controls the speed of the vehicle through the transmission or gear set 20, as the slower the pump goes, the faster the vehicle goes.

During variable speed mode, and at lower speeds, the hydraulic fluid is routed through the low pressure inlet port 18 of the manifold/end cover 16, and exits the manifold/end cover 16 through the high pressure outlet port 17, making power and charging the accumulators while the vehicle is accelerating.

At such time that the accumulators reach, full capacity, and the assist motor cannot accept all of it, the excess is sent to a holding tank.

During hybrid mode, the input shaft lockup members 39 & 42 are engaged, locking up the shaft 23 and therefore disengaging the engine power; while the hydraulic fluid pressure from the accumulator may be sent to the motor and thus used to variably propel the vehicle without using power from the engine of the vehicle.

The size of the accumulators used determines the distance traveled by the vehicle with the engine disconnected.

The manifold/end cover 16 used with the hydrostatic clutch system may have at least two inlet ports, including that of the depicted 18 & 21. In normal use, the inlet port 18 is open, and low pressure from the fluid circuit assembly 15, enters there; while the inlet port 21 is closed. At that time, the outlet port 17 is being regulated by the valve 19.

For additional launch power when the vehicle is stopped, the lockup plates 39 & 42 may be engaged, therefore input from the power source is disconnected from the hydrostatic clutch 10. The low pressure inlet 18 in the manifold/end cover 16 may be closed, and high pressure fluid from the accumulators may be routed into the manifold/end cover 16 through port 21 and then out port 17; and thus the pump 11 functions as a motor. This motor is then used to launch the vehicle with high pressure fluid from the accumulators. When the vehicle has reached a set speed, the high pressure inlet port 21 is closed, and the inlet port 18 is opened, therefore the pump again functions as a pump.

From a stop, with the engine turned off, both assist motors may be used to launch the vehicle, reducing fuel usage and lowering emissions.

Use of the present invention results in reduced fuel usage, as well as lowered emissions. The size of the system depends on the size of the vehicle. For example, a mid-sized pickup with the engine turning 2000 RPM's sends approximately 150 horsepower to the wheels at 70 mph. When the pressure from the accumulators and from the hydraulic pump is sent to the assist motor, the assist motor puts an approximate 125 horsepower to the wheels. Since only an additional 25 horsepower is needed to power the vehicle at 70 mph, at that time the RPM's of the engine may be reduced down to an approximate 900 RPM's; therefore, resulting in a 75-80% reduction in fuel usage, along with the accompanying major reductions in emissions. Through the use of the power from both assist motors, no power is needed from the engine for launch.

While the vehicle is under de-celeration, or slowing down, backpressure in the pump 11 is created by the weight of the vehicle acting as a brake, with the pressure being, stored in the accumulator. When full capacity of the accumulators is reached, a pressure regulator opens, and the excess fluid pressure goes to a holding tank.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the hydrostatic clutch system. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A hydrostatic clutch system comprising:
   a hydraulic pump having a pump housing with openings therein, and a manifold/end cover, wherein the hydraulic pump is an axial piston pump comprising a plurality of pistons and having a cylinder block;
   a hydraulic fluid circuit wherein the hydraulic fluid circuit is interconnected to high and low pressure inlet ports and an outlet port in the manifold/end cover, wherein the manifold/end cover is coupled to the hydraulic pump, wherein the fluid circuit also includes at least one fluid control valve in operable communication with the outlet port for creating backpressure in the pump;
   a valve to selectively control flow through the inlet ports in the end cover;
   at least one gear set or transmission,
   an input shaft in communication with the hydraulic pump, and
   input shaft lockup members including lockup plates with each said lockup plate having flanges attached to and spaced along a perimeter of the respective lockup plate, wherein one or more of the lockup plates are movably disposed face to face with the flanges of one of the lockup plates engagable with the flanges of an adjacent said lockup plate to lockup and prevent the rotation of the input shaft.

2. The hydrostatic clutch system as described in claim 1, wherein when the low pressure inlet port is closed; high pressure is routed to the high pressure inlet port so that the function of the pump is changed to that of a motor.

3. The hydrostatic clutch system as described in claim 2, wherein to effect reverse, high pressure is routed into the outlet port and exits out the low pressure inlet port, while the pump is functioning as the motor.

* * * * *